United States Patent [19]

Freeman

[11] Patent Number: 4,606,606
[45] Date of Patent: Aug. 19, 1986

[54] METHOD AND APPARATUS FOR CORRECTING DISTORTION AND CURVATURE OF FIELD IN A DISPLAY SYSTEM

[75] Inventor: Charles F. Freeman, Springfield, Va.

[73] Assignee: The United States of America as represented by the Secretary of the Army, Washington, D.C.

[21] Appl. No.: 605,965

[22] Filed: May 1, 1984

[51] Int. Cl.⁴ .............................................. G02B 27/02
[52] U.S. Cl. ..................................... 350/145; 350/137; 350/320; 350/616; 350/630
[58] Field of Search ................... 350/145, 162.22, 320, 350/420, 574, 137, 630, 616; 353/69, 70; 355/52

[56] References Cited

U.S. PATENT DOCUMENTS 3,212,397 10/1965 Miller ...................................... 353/70
4,401,367 8/1983 Grantham et al. ............. 350/162.22

FOREIGN PATENT DOCUMENTS 1132605 10/1968 United Kingdom ................ 350/443

Primary Examiner—John K. Corbin
Assistant Examiner—Vincent J. Lemmo
Attorney, Agent, or Firm—Max L. Harwell; Anthony T. Lane; Robert P. Gibson

[57] ABSTRACT

A distortion identification method which produces an undistorted rectilinear cross grid pattern for comparison with any distortion and curvature of field in a display system. An undistorted rectilinear grid, representing an infocus view of the display where an observer's eye would normally be in a display system, is positioned to be optically projected by a collimating lens and the optical element back to the display focal surface. A curved cross grid pattern of the rectilinear grid is laid on a glass substrate, which is form fitted to the display focal surface, by projection photolithography. The curved cross grid pattern indicates the shape of the focal surface required to present a high resolution display emanating therefrom which is in-focus to an observer viewing the display.

3 Claims, 4 Drawing Figures

METHOD AND APPARATUS FOR CORRECTING DISTORTION AND CURVATURE OF FIELD IN A DISPLAY SYSTEM

The invention described herein may be maunfactured, used, and licensed by the U.S. Government for governmental purposes without the payment of any royalties thereon.

BACKGROUND OF THE INVENTION

1. Field of the Invention

The invention is in the field of display systems which use optics therein in a method for identifying image distortion from the display focal surface to an observer, and especially the use of projection photolithography to project the shadow of a high resolution rectilinear grid at the output of the display system off the optics and onto the object surface to etch a curved cross grid pattern on the object surface, in which the curved cross grid pattern is a direct image of the high resolution rectilinear grid pattern and identifies distortion inherent in the optics within the display system.

2. Description of Prior Art

Previous display systems have used off-axis paraboloids as reflectors, but they are useful only for small viewing angles. Circular toroidal reflectors have also been used as reflective surfaces. The circular toroid has been found to be better than the parabola but still has spherical aberration and astigmatism off the line of symmetry of the toroid. There has been no provision of layering curved cross grids on the focal surface of a display device to provide a rectilinear grid to an observer.

SUMMARY OF THE INVENTION

The present invention is an improvement over display system in that optical aberrations, and especially astigmatism, are identified by comparison with a high resolution undistorted rectilinear cross grid pattern. The optically corrected display system is preferably mounted in an off-set orientation about the eye, such as brow or nasal mounted, and may be a head mounted CRT display.

The single optical element reflector in the display system, along with an added collimating lens with an aperture may be used in the method of optical projection photolithography to project the shadow of an undistorted rectilinear grid positioned at the output of the display system, i.e. where an observer's exit eye pupil would be located, to form a curved cross grid pattern substrate which is form fitted to the display device focal surface. The photolithographic process is accomplished by exposing the glass substrate with a layer of photoresist and by optically projecting from an ultraviolet light source one set of evenly spaced straight opaque lines, say in a horizontal direction, of the undistorted rectilinear grid on the glass substrate and then going through the etching process in the well known manner, including adding a phosphor layer. The process is repeated to form a second layer on said glass substrate wherein a set of evenly spaced straight vertical opaque lines are projected on the glass substrate during the layering of the vertical lines. The resulting curved cross grid linearly distorted pattern formed on the glass substrate in this process represents the exact shape of the display focal surface which is required to provide the undistorted rectilinear cross-grid pattern presented to an observer.

The use of this method to produce the particular display system and the novelty of the display system will become better understood by reference to the detailed description in view of the following drawings.

DETAILED DESCRIPTION OF THE EMBODIMENTS

Figure 1:
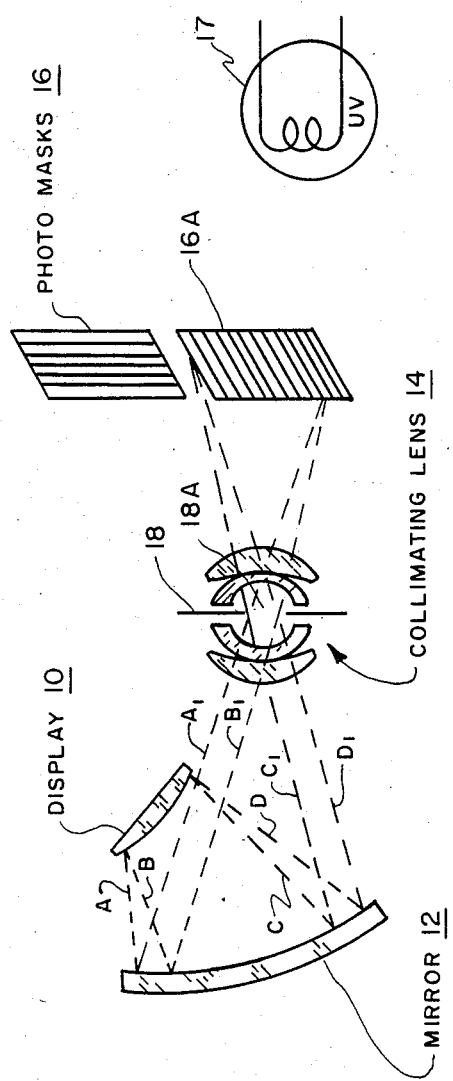
FIG. 1 illustrates the display system along with the optical system used for distortion correction therein.

Refer to FIG. 1 for a better understanding of the present display system and the method by which a high resolution rectilinear cross grid pattern is produced within the display system for comparing with and identifying distortion and curvature of field. The single optical element reflector is shown as mirror 12. The optical reflector element interfaces with the glass substrate which is form fitted to the display focal surface. The substrate and focal surface are represented herein by numeral 10. Since the present display system may be a head mounted CRT display, the single optical element reflector 12 is preferably used rather than the use of multioptical elements since the display would weigh less.

Refer again to FIG. 1 for the specifics of the photolithography method used for identifying distortion and curvature of field in the single optical element reflector display system. An undistorted rectilinear grid, comprised of evenly spaced but separate undistorted parallel opaque horizontal and vertical lines represented respectively by photomasks 16A and 16, are used in two separate photolithographic processes. The linear cross line shadow patterns of photomasks 16A and 16 are separately optically projected from ultraviolet light source 17 into the display system through aperture 18A of aperture plate 18 as collimated light beams, which are collimated by lens 14. These beams are represented by letters $A_1$ and $B_1$ as one pair of collimated beams and letters $C_1$ and $D_1$ as another pair of collimated beams. Beams $A_1$, $B_1$, $C_1$, and $D_1$ are reflected off mirror 12 directly onto the glass substrate respectively as beams A, B, C, and D. The rectilinear grid patterns of the photomasks 16A and 16 are transferred to the glass substrate as a curved cross grid pattern by optical projection photolithography. Since the curved grid cross pattern etched on the glass substrate has its origin from the undistorted rectilinear grid optically projected from the focal point at the output of the display system, the curved cross grid pattern represents the actual grid pattern required on the glass substrate to project the undistorted rectilinear grid pattern to an observer. Thus, the projection of the curved cross grid pattern etched on the glass substrate of the display focal surface corrects distortion both at the display focal surface and on the single optical element reflector mirror since the curved cross grid pattern exits the display as the undistorted rectilinear grid. The glass substrate and reflector mirror may be mass produced and then assembled and aligned in the display system to provide the present high resolution, light weight display having rectilinear grids overlaying the display as viewed by an observer.

The optics used in the photolithographic process are considered to be the collimating lens 14, the single element mirror optical system 12, and the substrate. The glass substrate has an oxide surface, preferably of SiO₂, thereon which is first covered with a layer of photoresist and one of the undistorted parallel lined photomasks, say horizontal lined photomask 16A, is optically projected from the ultraviolet light source 17 by the optics to glass substrate 10. Portions of the photoresist not shaded by the opaque horizontal lines of 16A are hardened by this exposure. The unexposed lines of photoresist are washed away leaving a photoresist mask. After the masking step, an etching step follows during which the parts of the oxide layer not protected by the exposed photoresist are etched away forming the horizontal curved lines of the curved cross grid pattern. Following the etching step the photoresist is washed away and the glass substrate is ready for the next diffusion step. The same steps of masking, etching, and washing away the photoresist are followed in layering the vertical curved lines to form the curved cross grid pattern by projecting the undistorted lines of the vertical lined photomask 16. The oxide surface has phosphor layered thereon, preferably during each cycle of the steps, to be sensitive to the light frequencies emitted from the display device. The phosphor display may be a crossed line addressable electroluminescent phosphor display that conforms to the display focal surface.

Figure 2A:
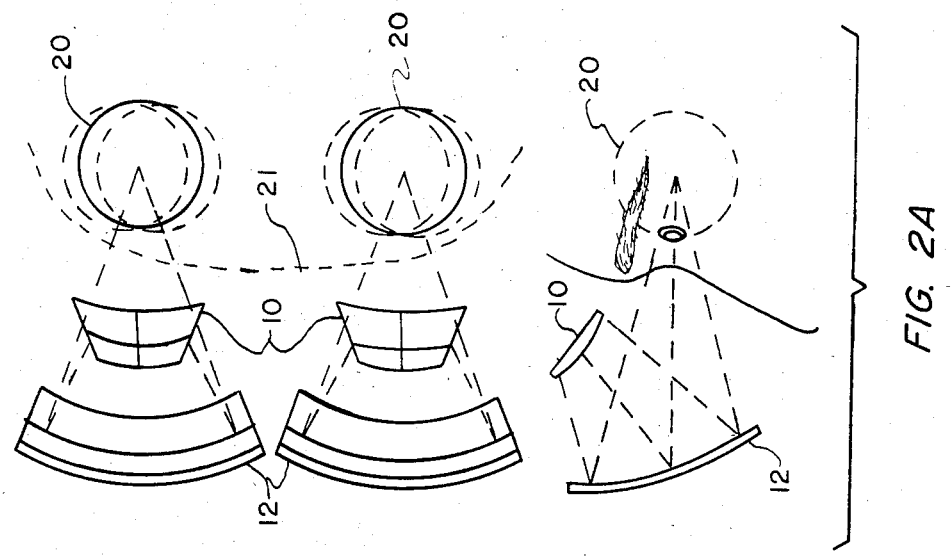
FIGS. 2A, 2B, and 2C show in partial view various head mountings of the present display systems.
Figure 2B:
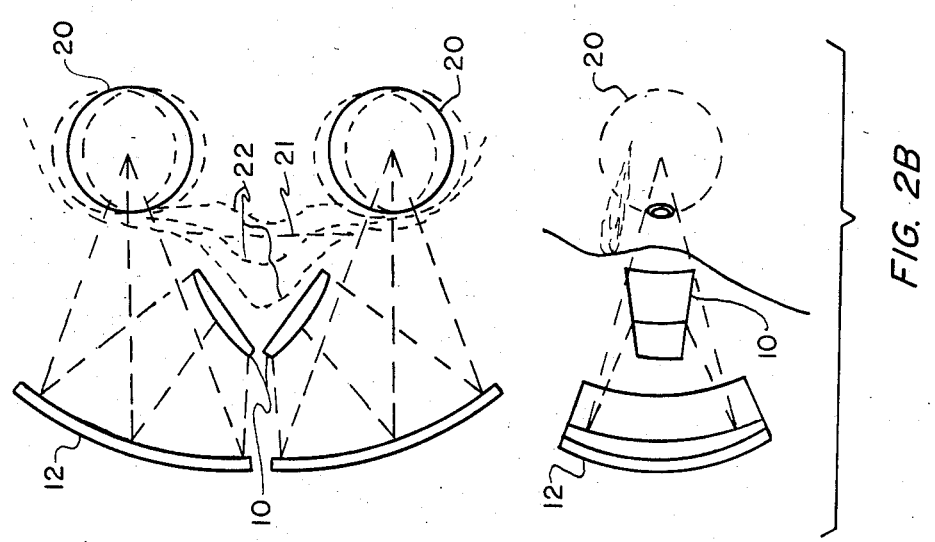
Figure 2C:
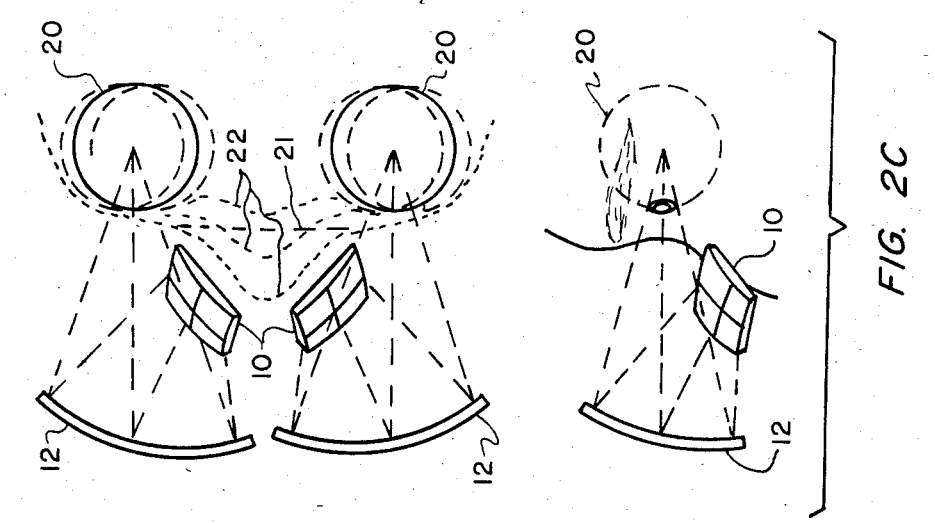

Even though the present display system has been explained as having a single optical element and one display to provide a monocular display, the display system may be a binocular display. The collimating lens 14 including the aperture plate 18 are removed after the optical projection photolithography technique of establishing the curved cross grid pattern. An observer's exit eye pupil wuld normally be at apreture 18A when using the display system. FIGS. 2A, 2B, and 2C illustrate three possible orientations of a head mounted binocular display with optical paths from each display focal surface 10 to a separate eye. The eyes are represented by numeral 20, the brow by numeral 21, and possibly different size noses by numeral 22. The dashed circles on each side of the solid circle 20 in the upper, i.e. top, view represent different head sizes which cause the extremes in interocular spacing of about an average of 62 millimeters. By using a single optical element for the reflecting mirror 12, an interpupilary adjustment between the extreme positions of eyes 20 need not be provided. Specifically, FIG. 2A illustrates a brow orientation; FIG. 2B a nasal orientation; and FIG. 2C a nasal orientation which is depressed 45° down toward the cheek. That is, the binocular display is always oriented in an offset position with respect to the eyes of the observer. The appropriateness of each orientation varies according to the needs for the particular display system. For example, the brow orientation provides the largest field of view. Each mirror 12 is positioned directly in front of the observer's exit eye pupil. The mirror may be made of plastic, such as high impact polystyrene.

Even though only one method for making the display system and only one display system embodiment having various mounting schemes therefor are shown, other modifications may be made to various forms of the invention described herein without departure from the spirit and scope of the appended claims.

I claim:

1. A method for identifying distortion in the optical elements of a head mounted display system mounted in optically off-set orientation, said method comprising the steps of:

aligning a display focal surface having a glass substrate optical element thereon with a surface conforming to said focal surface and an off-set single optical element circular toroidal reflector in said display system;

placing a collimating lens having an aperture at the focal plane of said display system where a virtual image of the display emitted from said display focal surface would be viewed by an observer;

selectively positioning evenly spaced horizontal and vertical undistorted linear grid patterns on the output side of said collimating lens wherein the overlay of said horizontal and vertical grid patterns form a high resolution undistorted rectilinear grid pattern; and using optical projection photolithography methods to project a separate image of each of said horizontal and said vertical undistorted linear grid patterns in two separate photolithographic steps to etch a curved cross grid pattern of rectilinear lines on said glass substrate optical element wherein said curved cross grid pattern is a direct image of said high resolution undistorted rectilinear grid pattern identifying distortion inherent in said single optical element reflector and in said glass substrate optical element to provide said high resolution undistorted rectilinear grid pattern overlaying said display for comparing with the scene as viewed by an observer.

2. A method as set forth in claim 1 wherein included in each of said two separate photolithography steps is a further step of applying phosphor to said glass substrate.

3. A display system mounted in an off-set orientation about an observer's eye wherein a high resolution virtual image of a display having a rectilinear grid overlay is projected to an observer, said system comprising:

a display comprised of a focal surface and a glass substrate optical element form fitted thereto in which said glass substrate optical element has a phosphor pattern in a curved cross grid linearly distorted pattern thereon; and a single optical circular toroidal element reflector for reflecting an image at the output of said display focal surface including said curved cross grid linearly distorted pattern to the output of said display system as an image having an undistorted rectilinear grid pattern overlay in focus over the entire field of view for comparing with the scene as viewed by said observer.

* * * * *